(12) United States Patent
Okuno et al.

(10) Patent No.: US 6,611,637 B1
(45) Date of Patent: Aug. 26, 2003

(54) DISPERSION-COMPENSATING MODULE

(75) Inventors: Toshiaki Okuno, Yokohama (JP); Shinji Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/542,280

(22) Filed: Apr. 4, 2000

Related U.S. Application Data

(63) Continuation-in-part of application No. PCT/JP98/04564, filed on Oct. 9, 1998.

(30) Foreign Application Priority Data

Dec. 8, 1997 (JP) .............................. 9-337169
Mar. 31, 1998 (JP) .......................... 10-0876296

(51) Int. Cl.⁷ .............................. G02B 6/34; H04J 14/02
(52) U.S. Cl. ............................. 385/24; 385/37; 385/27; 359/124; 359/130; 359/161; 359/173
(58) Field of Search ........................... 385/24, 37, 27; 359/124, 130, 134, 161, 173, 188, 341

(56) References Cited

U.S. PATENT DOCUMENTS

| | | | | |
|---|---|---|---|---|
| 5,966,228 A | * | 10/1999 | Akiba et al. | 359/173 |
| 6,137,604 A | * | 10/2000 | Bergano | 359/124 |
| 6,154,588 A | * | 11/2000 | Kai | 385/27 |
| 6,181,449 B1 | * | 1/2001 | Taga et al. | 359/124 |
| 6,222,962 B1 | * | 4/2001 | Nilsson et al. | 385/37 |
| 6,304,691 B1 | * | 10/2001 | Espindola et al. | 385/24 |
| 6,404,950 B1 | | 6/2002 | Tsukitani et al. | |
| 2001/0005277 A1 | * | 6/2001 | Laming | |

FOREIGN PATENT DOCUMENTS

| | | |
|---|---|---|
| JP | 54-2143 | 1/1979 |
| JP | 5-37472 | 2/1993 |
| JP | 5-152645 | 6/1993 |
| JP | 8-122531 | 5/1996 |
| JP | 8-220370 | 8/1996 |
| JP | 8-237222 | 9/1996 |
| JP | 8-248229 | 9/1996 |
| JP | 8-271738 | 10/1996 |
| JP | 8-278523 | 10/1996 |
| JP | 9-162805 | 6/1997 |

OTHER PUBLICATIONS

Taga et al., "10WDM x 10Gbit/s Long–Distance Transmission Experiment Using a Despersion Slope Compensaot and Non–Soliton RZ Pulse", KDD R+D Laboratories.

* cited by examiner

Primary Examiner—Hemang Sanghavi
(74) Attorney, Agent, or Firm—McDermott, Will & Emery

(57) ABSTRACT

The present invention relates to a dispersion-compensating module functioning to compensate for the chromatic deviation occurring in an optical transmission line and comprising a structure adapted to be easily inserted in an optical transmission system. The dispersion-compensating module according to the present invention comprises an input end and an output end for signal light, and also comprises dispersion-compensating means such as a dispersion-compensating optical fiber or the like, and loss-equalizing means for compensating for at least the wavelength-dependent loss deviation in the dispersion-compensating means.

36 Claims, 12 Drawing Sheets

DISPERSION-COMPENSATING MODULE

RELATED APPLICATIONS

This is a Continuation-In-Part application of International Patent Application serial No. PCT/JP98/04564 filed on Oct. 9, 1998, now pending.

BACKGROUND OF THE INVENTION

1. Field of the Invention

The present invention relates to a dispersion-compensating module which is disposed in an optical transmission line suitable for optical communications such as wavelength division multiplexing (WDM) transmission and the like and which, constituting a part of the optical transmission line, compensates for the chromatic dispersion in the wavelength band of WDM signals.

2. Related Background Art

In general, conventional optical communications systems have a configuration in which a transmission optical fiber is mainly used as an optical transmission line, while optical amplifiers are disposed at appropriate repeating intervals. Since signal light attenuates while propagating through the transmission optical fiber, the optical amplifier is employed as an optical device for amplifying the signal light power of WDM signals containing a plurality of wavelengths of signal light components, and the like, for example. The optical amplifier usually comprises an amplifying section for amplifying the optical power of respective light signals and an equalizing section for lowering the gain differences occurring among the respective light signals, thus yielding not only an optical amplifying effect but also a gain-equalizing effect. Therefore, in the case where WDM transmissions are carried out, the optical amplifier can optically amplify the respective light signals of the WDM signals with a substantially uniform gain.

As the transmission optical fiber, on the other hand, a single-mode optical fiber is usually employed. While this single-mode optical fiber has a positive chromatic dispersion (about +17 ps/nm/km) in a 1.55-$\mu$m wavelength band (1500 nm to 1600 nm), if a large chromatic dispersion exists, then the pulse waveform of the WDM signals may deform, thereby causing reception errors. In particular, the existence of chromatic dispersion becomes a large problem if a higher speed, i.e., higher band, on the order of several gigabits/sec to several tens of gigabits/sec is attained. Hence, there has been proposed an optical communication system in which a dispersion compensator is disposed in the optical transmission line in order to compensate for the above-mentioned chromatic dispersion (see, for example, the Institute of Electronics, Information and Communication Engineers, Communication Society Convention 1997, B-10-70 and B-10-71). Also, as the dispersion compensator, a dispersion-compensating optical fiber having a large negative chromatic dispersion (about −90 ps/nm/km) in the 1.55-$\mu$m wavelength band is used, for example.

SUMMARY OF THE INVENTION

The inventors have studied the above-mentioned prior art and, as a result, found problems as follows. Namely, since deviations in transmission loss among respective light signals in the WDM wavelength band are so large that wavelength dependence is not negligible, there are problems as follows.

By way of example, a typical configuration in which, as shown in FIG. 1A, a dispersion compensator 3 is disposed between an optical amplifier 1 and an optical amplifier 2 in a stage next thereto in an optical transmission line will be explained. In this optical transmission line, the respective light signals (wavelengths $\lambda_1$ to $\lambda_4$) in the WDM signals outputted from the optical amplifier 1 are assumed to have an uniform optical power.

In the foregoing configuration, when signal light components shown in FIG. 1B are inputted to the optical amplifier 1, then amplified signal light components shown in FIG. 1C are outputted therefrom. As the light signals outputted from the optical amplifier 1 are inputted to the dispersion compensator 3, the chromatic dispersion of the transmission optical fiber is compensated for. On the other hand, since the transmission loss in the dispersion compensator 3 changes depending on a wavelength, the light signals outputted from the dispersion compensator 3 would not have an uniform optical power (see FIG. 1D). Also, if the light signals outputted from the dispersion compensator 3 are further inputted to the optical amplifier 2, the light signals outputted from the optical amplifier 2 (see FIG. 1E) will have been amplified in a state including the optical power differences among the respective light signals at the time of input. Therefore, in the case where a plurality of dispersion compensators are disposed between a transmitting station and a receiving station, the differences in optical power among the light signals reaching the receiving station would become greater as they are successively accumulated. If the differences in optical power among the light signals reaching the receiving station are large as such, some signal light components may deteriorate their S/N ratio so much that they cannot be received. Hence, in the case of inserting a dispersion compensator, it is necessary to redesign an optical transmission system as a whole, so as to eliminate the above-mentioned problems.

For solving the above-mentioned problems, it is an object of the present invention to provide a dispersion-compensating module which functions to compensate for the chromatic dispersion occurring in an optical transmission line and which has a low wavelength dependence of transmission loss, having its structure adapted to be easily inserted in an optical transmission system.

Therefore, the dispersion-compensating module according to the present invention has an input end on which light of one or more light signals (included in WDM signals) whose respective center wavelengths are included in a predetermined wavelength band are inputted, and an output end from which the WDM signals exit; and can be installed not only between a transmitting station and a receiving station, but also between the transmitting station and a repeater, between repeaters, and between a repeater and the receiving station. Also, the dispersion-compensating module comprises dispersion-compensating means, such as a dispersion-compensating optical fiber or the like, disposed in an optical path between the input end and the output end in order to lower the wavelength dependence of transmission loss; and loss-equalizing means for compensating for a wavelength-dependent loss deviation of the dispersion-compensating means.

Here, depending on the object to be compensated for, the above-mentioned dispersion-compensating means has a positive or negative dispersion slope in the wavelength band of the above-mentioned WDM signals (e.g., 1500 nm to 1600 nm). Further, depending on the object to be compensated for, the dispersion of the dispersion-compensating means has a positive or negative value in the wavelength band of the WDM signals.

Also, the dispersion-compensating module according to the present invention can function as a repeater when further comprising optical amplifying means. In this configuration, the above-mentioned loss-equalizing means compensates for at least the loss deviations of the above-mentioned dispersion-compensating means depending on the wavelengths of respective light signals and the gain deviations of the above-mentioned dispersion-compensating means dependent on the wavelengths of respective light signals.

Further, the dispersion-compensating module according to the present invention can further comprise a demultiplexer for demultiplexing each of the above-mentioned signal light components, and a multiplexer for multiplexing respective light signals demultiplexed by the demultiplexer. In this configuration, the above-mentioned dispersion-compensating means compensates for a dispersion in a larger wavelength band between the entrance end and the demultiplexer, and also compensates for a dispersion in a smaller wavelength band for respective demultiplexed light signals. The above-mentioned loss-equalizing means adjusts the optical power of respective demultiplexed light signals. Preferably, the loss-equalizing means is disposed in an optical path between the entrance end of the dispersion-compensating module and the dispersion-compensating compensating means, i.e., in front of the dispersion-compensating means in the propagating direction of respective light signals. In this case, since the light signals inputted to the dispersion-compensating module are inputted to the dispersion-compensating means after being attenuated by their desirable values corresponding to the respective wavelengths thereof by the loss-equalizing means, nonlinear optical phenomena are unlikely to occur in the dispersion-compensating means, whereby the light signals are kept from deteriorating their waveforms. Also in this configuration, while the chromatic dispersion in the optical transmission line is compensated for by the dispersion-compensating means appropriately disposed at a predetermined location, the wavelength-dependent loss deviation of the dispersion-compensating means is compensated for by the loss-equalizing means for adjusting the optical power of respective light signals between the input end and the dispersion-compensating means.

Specifically, the above-mentioned loss-equalizing means may be a loss-equalizing optical fiber having a core region doped with a transition metal, and a cladding region disposed on the outer periphery of the core region. By appropriately selecting the kind and amount of transition metal such as Cr element, Co element, or the like added into the core region, such a loss-equalizing optical fiber is easily designed so as to compensate for the wavelength-dependent loss deviation of the dispersion-compensating means.

Also, the above-mentioned dispersion-compensating means includes a single-mode optical fiber having a zero-dispersion wavelength in a 1.3-$\mu$m wavelength band or a dispersion-shifted optical fiber, whereas the above-mentioned loss-equalizing means includes an optical fiber formed with a long-period,fiber grating which couples a propagation mode and a radiation mode. This long-period fiber grating is an optical component which is clearly distinguished from a short-period fiber grating which reflects only a predetermined wavelength of signal light component. Such a long-period fiber grating acting as the loss-equalizing means can flatten the loss deviation among the respective light signals without greatly deteriorating the transmission loss of the dispersion-compensating module as a whole, and can easily yield a desirable loss characteristic in a wide wavelength band. In particular, in the configuration mentioned above in which the optical fiber acting as the dispersion-compensating means is directly formed with the long-period fiber grating acting as the loss-equalizing means, it is not necessary for the dispersion-compensating means to be provided with a connecting portion which may generate loss, and the influence of the loss in the connecting portion is not needed to be taken into consideration, whereby it becomes easier to adjust wavelength-dependent loss characteristics.

Further, the above-mentioned loss-equalizing means may be a fiber fusion type coupler (fiber coupler). In particular, it is preferable for this fiber coupler to have a polarization-dependent loss (PDL) of 0.2 dB or less. It is because a fiber coupler having a PDL greater than 0.2 dB cannot strictly control the compensation of the PDL.

On the other hand, the above-mentioned loss-equalizing means may be made of a fused portion obtained by fusion-splicing respective ends of a pair of optical fibers. In this case, the pair of optical fibers at the fused portion may be fusion-spliced in a state where their respective optical axes are deviated from each other or in a state where their core regions are bent. Further, each of the pair of optical fibers to be fusion-spliced may comprise a core region whose diameter increases toward the fused portion. In any case, a desirable characteristic (characteristic with a smaller wavelength dependence) can favorably be obtained.

Preferably, in the dispersion-compensating module according to the present invention, of the light signals emitted from the above-mentioned exit end, at least those having their center wavelength within the wavelength range of 1530 nm to 1565 nm have an optical power deviation of 0.5 dB or less therebetween. It is because of the fact that favorable transmission characteristics can be expected over several hundreds of kilometers if the optical power deviation among the light signals is suppressed to the above-mentioned value or less in a wavelength band used in a normal erbium-doped fiber amplifier (EDFA).

Also, in the WDM transmission in a 1580-nm band, of the light signals emitted from the above-mentioned exit end, at least those having their center wavelength within the wavelength range of 1560 nm to 1600 nm preferably have an optical power deviation of 0.5 dB or less therebetween. It is because of the fact that favorable transmission characteristics can be expected over several hundreds of kilometers if this condition is satisfied.

In particular, in the long-distance optical transmission beyond 1000 km, of the light signals emitted from the above-mentioned exit end, at least those having their center wavelength within the wavelength range of 1535 nm to 1560 nm preferably have an optical power deviation of 0.5 dB or less therebetween; and further, of the light signals emitted from the above-mentioned exit end, at least those having their center wavelength within the wavelength range of 1575 nm to 1595 nm preferably have an optical power deviation of 0.5 dB or less therebetween.

For yielding a favorable transmission characteristic with a BER (Bit Error Ratio) of $10^{-15}$ or less in the high-speed transmission of 10 gigabits/sec or faster in the long-distance optical transmission beyond 1000 km, on the other hand, of the light signals emitted from the above-mentioned exit end, at least those having their center wavelength within the wavelength range of 1550 nm to 1560 nm preferably have an optical power deviation of 0.2 dB or less therebetween; and further, of the light signals emitted from the above-mentioned exit end, at least those having their center wavelength within the wavelength range of 1575 nm to 1585 nm preferably have an optical power deviation of 0.2 dB or less therebetween.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a view showing a typical cross-sectional structure of an optical fiber employable as dispersion-compensating means or loss-equalizing means, whereas

FIGS. 4A to 4C are graphs showing the wavelength dependence of transmission loss of the dispersion-compensating module according to the first embodiment shown in FIGS. 2A to 2F, in which FIG. 4A is a chart showing the relationship between transmission loss and wavelength in the dispersion-compensating means, FIG. 4B is a chart showing the relationship between transmission loss and wavelength in the loss-equalizing means, and FIG. 4C is a chart showing the relationship between transmission loss and wavelength in the dispersion-compensating module as a whole;

FIGS. 15A to 15D are views showing a ninth embodiment of the dispersion-compensating module according to the present invention and its specific examples, in which FIG. 15A is a view showing a schematic configuration of the ninth embodiment, FIG. 15B is a view showing a first specific example of the ninth embodiment, FIG. 15C is a view showing a second specific example of the ninth embodiment, and FIG. 15D is a view showing a third specific example of the ninth embodiment;

FIGS. 20A to 20F are views showing a whole optical transmission system to which a dispersion-compensating module according to the present invention is applied, in which FIG. 20A is a view showing a schematic configuration of the optical transmission system, FIG. 20B is a chart showing WDM signals (wavelengths $\lambda_1$ to $\lambda_4$) at a location indicated by the arrow A3 in FIG. 20A, FIG. 20C is a chart showing the WDM signals at a location indicated by the arrow B3 in FIG. 20A, FIG. 20D is a chart showing the WDM signals at a location indicated by the arrow C3 in FIG. 20A, FIG. 20E is a chart showing the WDM signals at a location indicated by the arrow D3 in FIG. 20A, and FIG. 20F is a chart showing the WDM signals at a location indicated by the arrow E3 in FIG. 20A;

DESCRIPTION OF THE PREFERRED EMBODIMENTS

In the following, embodiments of the dispersion-compensating module according to the present invention will be explained with reference to FIGS. 2A to 4C, 5 to 14, 15A to 15D, 16 to 19, and 20A to 20F. In the explanation of the drawings, constituents identical to each other will be explained with numerals identical to each other without repeating their overlapping descriptions.

First Embodiment

Figure 1A:
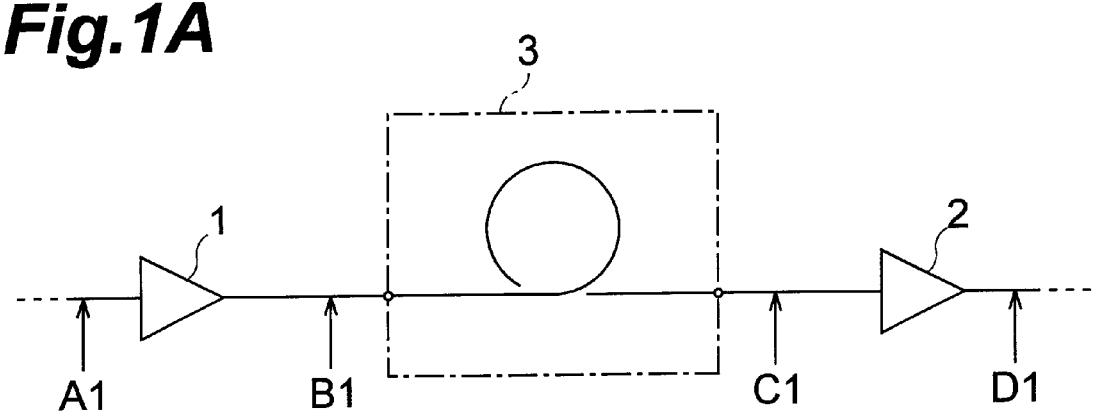
FIG. 1A is a view showing the configuration of a conventional dispersion compensator.
Figure 1B:
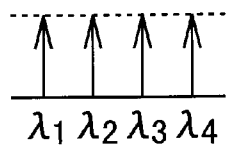
FIG. 1B is a chart showing WDM signals (wavelengths $\lambda_1$ to $\lambda_4$) at a location indicated by the arrow A1 in FIG. 1A.
Figure 1C:
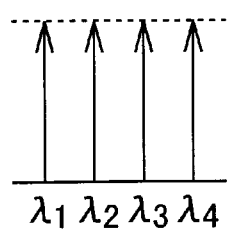
FIG. 1C is a chart showing the WDM signals at a location indicated by the arrow B1 in FIG. 1A.
Figure 1D:
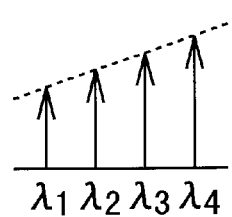
FIG. 1D is a chart showing the WDM signals at a location indicated by the arrow C1 in FIG. 1A.
Figure 1E:
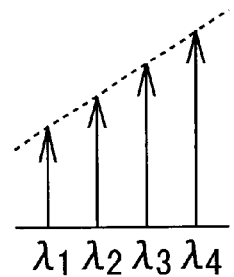
FIG. 1E is a chart showing the WDM signals at a location indicated by the arrow D1 in FIG. 1A.
Figure 2A:
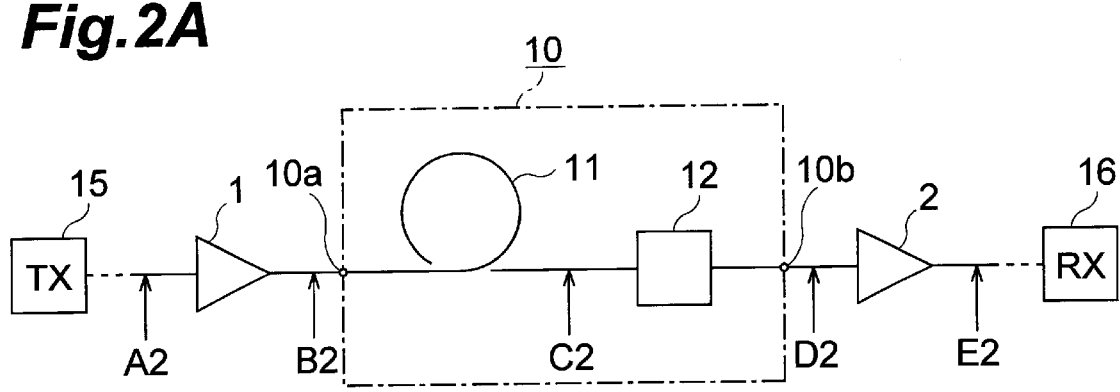
FIG. 2A is a view showing a schematic configuration of a first embodiment of the dispersion-compensating module according to the present invention.
Figure 2B:
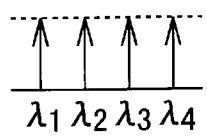
FIG. 2B is a chart showing WDM signals (wavelengths $\lambda_1$ to $\lambda_4$) at a location indicated by the arrow A2 in FIG. 2A.
Figure 2C:
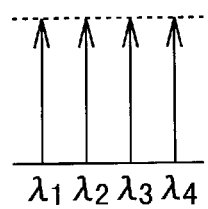
FIG. 2C is a chart showing the WDM signals at a location indicated by the arrow B2 in FIG. 2A.
Figure 2D:
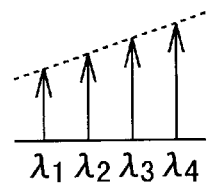
FIG. 2D is a chart showing the WDM signals at a location indicated by the arrow C2 in FIG. 2A.
Figure 2E:
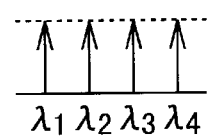
FIG. 2E is a chart showing the WDM signals at a location indicated by the arrow D2 in FIG. 2A.
Figure 2F:
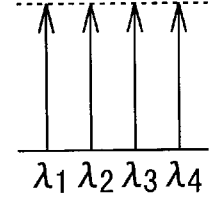
FIG. 2F is a chart showing the WDM signals at a location indicated by the arrow E2 in FIG. 2A.

To begin with, a first embodiment of the dispersion-compensating module according to the present invent ion will be explained. FIG. 2A is a view showing a schematic configuration of the first embodiment of the dispersion-compensating module according to the present invention. Here, FIGS. 2B, 2C, 2D, 2E, and 2F show the WDM signals (wavelengths $\lambda_1$ to $\lambda_4$) at locations indicated by the arrows A2, B2, C2, D2, and E2 in FIG. 2A, respectively.

FIG. 2A shows an optical transmission system, suitable for WDM transmission, comprising a transmitting station 15, a front-stage optical amplifier 1 for optically amplifying a signal light component propagated through a predetermined transmission line after being emitted from the transmitting station 15, a dispersion-compensating module 10 having an input end 10a optically connected to an output end of the optical amplifier 1, a rear-stage optical amplifier 2 having an input end optically connected to an output end 10b of the dispersion-compensating module 10, and a receiving station 16 for receiving the signal light component emitted from the optical amplifier 2.

The dispersion-compensating module 10 according to the first embodiment comprises a dispersion-compensating optical fiber 11 acting as dispersion-compensating means and a loss equalizer 12 acting as loss-equalizing means, whereas the dispersion-compensating optical fiber 11 and the loss equalizer 12, each being disposed in an optical path between the input end 10a and output end 10b of the dispersion-compensating module 10, are optically connected to each other.

Figure 3A:
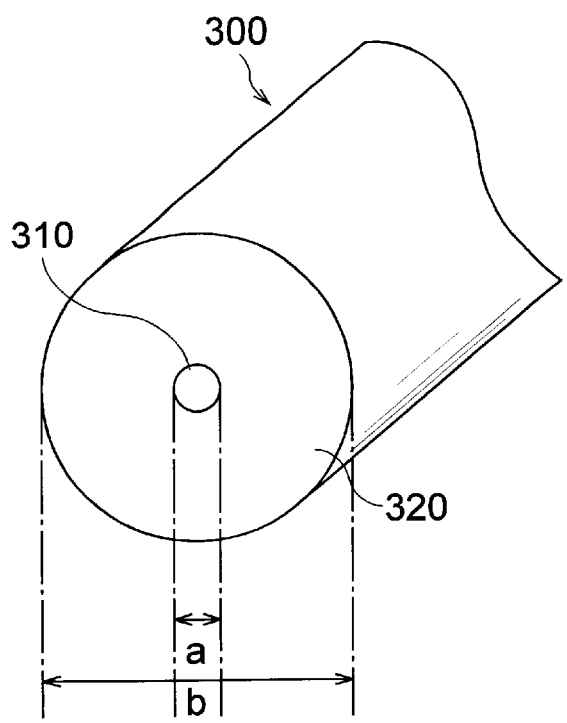
Figure 3B:
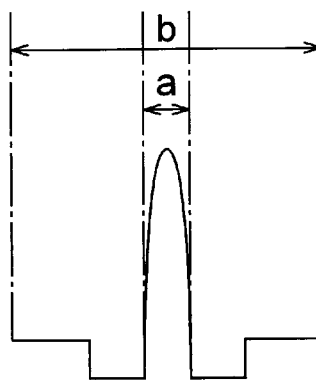
FIGS. 3B and 3C are views each showing an example of refractive index profile of a dispersion-compensating optical fiber acting as the dispersion-compensating means.

The dispersion-compensating optical fiber 11 is an optical device which compensates for the chromatic dispersion in the wavelength band of the WDM signals in the optical transmission line in which the dispersion-compensating module 10 is inserted. In general, since single-mode optical fibers used as the optical transmission line have a positive wavelength dispersion slope, optical fibers each having a negative wavelength dispersion slope are employable as the dispersion-compensating optical fiber 11. Specifically, the dispersion-compensating optical fiber 11 in the first embodiment comprises a structure similar to that of an optical fiber 300 shown in FIG. 3A. Namely, the optical fiber 300 comprises a core region 310 having an outside diameter a, and a cladding region 320, disposed at the outer periphery of the core region 310, having an outside diameter b. In the first embodiment, in particular, the dispersion-compensating optical fiber 11 has a W-shaped refractive index profile (refractive index profile having a depressed cladding structure in which the cladding region 320 is constituted by two layers having respective refractive indices different from each other) as shown in FIG. 3B. Here, the dispersion slope is defined by the gradient of a graph indicating a dispersion characteristic in a predetermined wavelength band.

On the other hand, the loss equalizer 12 compensates for at least the wavelength-dependent loss deviation of the dispersion-compensating optical fiber 11 in the wavelength band of the WDM signals. For example, a multilayer filter, long-period fiber grating, Fabry-Perot etalon, and the like are preferable as the loss equalizer 12.

Figure 4A:
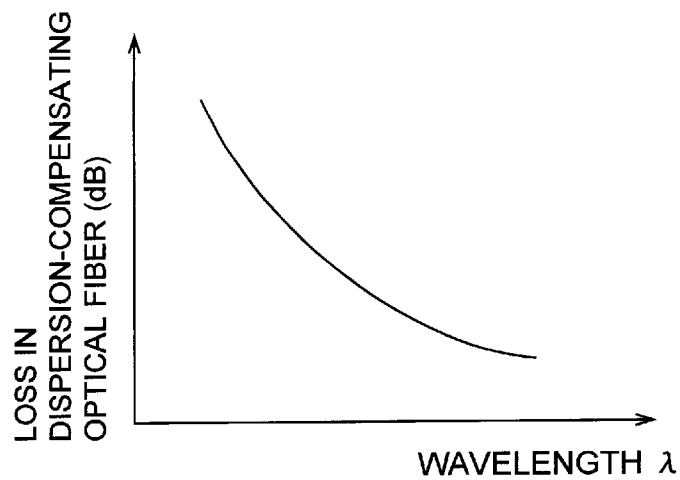
Figure 4B:
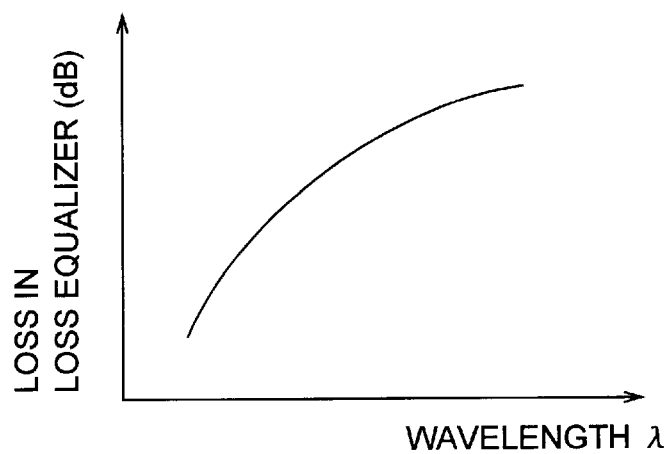
Figure 4C:
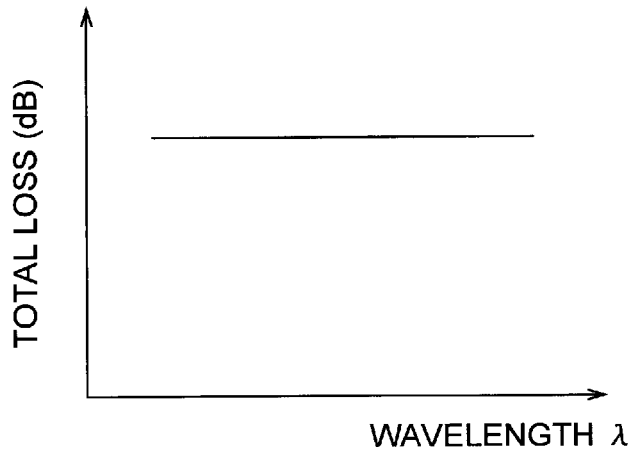

FIGS. 4A to 4C are graphs showing the wavelength dependence of the dispersion-compensating module according to the first embodiment shown in FIGS. 2A to 2F. In particular, FIG. 4A shows the relationship between transmission loss and wavelength in the dispersion-compensating means, FIG. 4B shows the relationship between transmission loss and wavelength in the loss-equalizing means, and FIG. 4C shows the relationship between transmission loss and wavelength in the dispersion-compensating module as a whole. As can also be seen from FIG. 4A, the transmission loss of the dispersion-compensating optical fiber 11 becomes smaller as wavelength is longer in the 1.55-$\mu$m wavelength band in general. By contrast, as can also be seen from FIG. 4B, the transmission loss of the loss equalizer 12 is designed so as to become greater as wavelength is longer, thereby being able to compensate for the loss wavelength characteristic of the dispersion-compensating optical fiber 11. Hence, the total loss of the dispersion-compensating module according to the first embodiment as a whole is the total of the respective transmission loss values of the dispersion-compensating optical fiber 11 and the loss equalizer 12, whereby its wavelength dependence as a whole is lowered (loss deviations among the respective wavelengths are lowered) as can also be seen from FIG. 4C.

Second Embodiment

Figure 5:
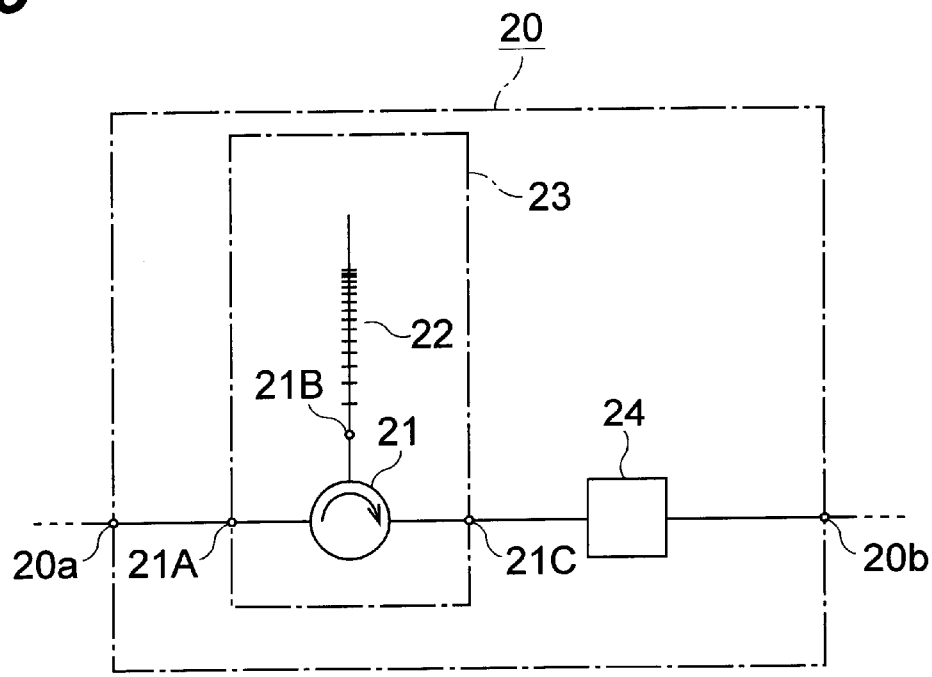
FIG. 5 is a view showing a schematic configuration of a second embodiment of the dispersion-compensating module according to the present invention.

A second embodiment of the dispersion-compensating module according to the present invention will now be explained. FIG. 5 is a view showing a schematic configuration of the second embodiment of the dispersion-compensating module according to the present invention.

In the dispersion-compensating module 20 according to the second embodiment, as in the first embodiment, dispersion-compensating means and loss-equalizing means are disposed in an optical path between an input end 20a and an output end 20b while being optically connected to each other. Specifically, the second embodiment differs from the first embodiment in that it comprises, as the dispersion-compensating means, a chromatic dispersing device 23 constituted by a three-terminal circulator 21 and a chirped grating 22.

The three-terminal circulator 21 is an optical device which outputs light incident on a terminal 21A to a terminal 21B and outputs light inputted to the terminal 21B to a terminal 21C. On the other hand, the chirped grating 22 is a grating formed in an optical waveguide region of an optical fiber optically connected to the terminal 21B of the three-terminal circulator 21, and functions to compensate for the chromatic dispersion in the transmission line.

The WDM signals incident on the input end 20a of the dispersion compensator 23, which is constituted by the three-terminal circulator 21 and the chirped grating 22, initially enters the terminal 21A of the three-terminal circulator 21 and exits from the terminal 21B. Then, the respective light signals are reflected at positions satisfying Bragg condition (Bragg reflection) in the chirped grating 22 according to their wavelengths. Respective light signals reflected at a predetermined position in the chirped grating 22 is made incident on the terminal 21B of the three-terminal circulator 21 again and exits from the terminal 21C. Namely, depending on the wavelength of the respective light signals, the propagation time of the WDM signals incident by way of the entrance end 20a varies from when it enters the terminal 21A of the three-terminal circulator 21 until it exits from the terminal 21C. As a consequence, the dispersion compensator 23 compensates for the chromatic dispersion in the wavelength band of the WDM signals in the optical transmission line in which the dispersion-compensating module 20 of the second embodiment is inserted.

The loss equalizer 24 is an optical device which compensates for at least the wavelength-dependent loss deviation of the dispersion compensator 23 in the wavelength band of the WDM signals. For example, a multilayer filter, long-period fiber grating, Fabry-Perot etalon, and the like are preferable as the loss equalizer 24. Also in the second embodiment, the total loss of the dispersion-compensating module 20 as a whole is the total of the respective transmission loss values of the dispersion compensator 23 and the loss equalizer 24, whereby the wavelength dependence is lowered as a whole.

Third Embodiment

Figure 6:
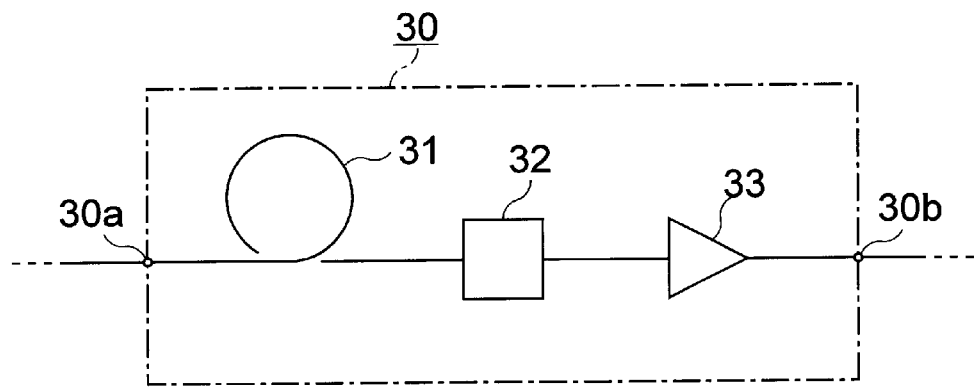
FIG. 6 is a view showing a schematic configuration of a third embodiment of the dispersion-compensating module according to the present invention.

A third embodiment of the dispersion-compensating module according to the present invention will now be explained. FIG. 6 is a view showing a schematic configuration of the third embodiment of the dispersion-compensating module according to the present invention.

Also in the dispersion-compensating module 30 according to the second embodiment, dispersion-compensating means and loss-equalizing means are disposed in an optical path between an input end 30a and an output end 30b while being optically connected to each other. Specifically, in the third embodiment, a dispersion-compensating optical fiber 31 as dispersion-compensating means, a loss equalizer 32 as loss-equalizing means, and an optical amplifier 33 are disposed while in a state optically connected to one another.

The dispersion-compensating optical fiber 31 is an optical device for compensating for the chromatic dispersion in the wavelength band of the WDM signals in the optical transmission line in which the dispersion-compensating module 30 is inserted. The optical amplifier 33 is an optical device which amplifies the optical power of respective light signals contained in the WDM signals incident by way of the entrance end 30a and outputs thus amplified signal, and its gain characteristic may not necessarily be flat with respect to wavelength. As the optical amplifier 33, an optical fiber amplifier (EDFA: Erbium-Doped fiber amplifier) using an optical fiber (EDF: Erbium-Doped fiber) doped with Er (erbium) element is preferable, for example. On the other hand, the loss equalizer 32 simultaneously compensates for (flattens) the wavelength-dependent loss deviation in the dispersion-compensating optical fiber 31 in the wavelength band of the WDM signals and the wavelength-dependent gain deviation in the optical amplifier 33. For example, a multilayer filter, long-period fiber grating, Fabry-Perot etalon, and the like are preferable as the loss equalizer 32, too.

The total loss of the dispersion-compensating module 30 according to the third embodiment as a whole would also have a lower wavelength dependence as compared with the respective wavelength dependence characteristics of loss deviations in the dispersion-compensating optical fiber 31 and loss equalizer 32 and of gain deviation in the optical amplifier 33.

Fourth Embodiment

Figure 7:
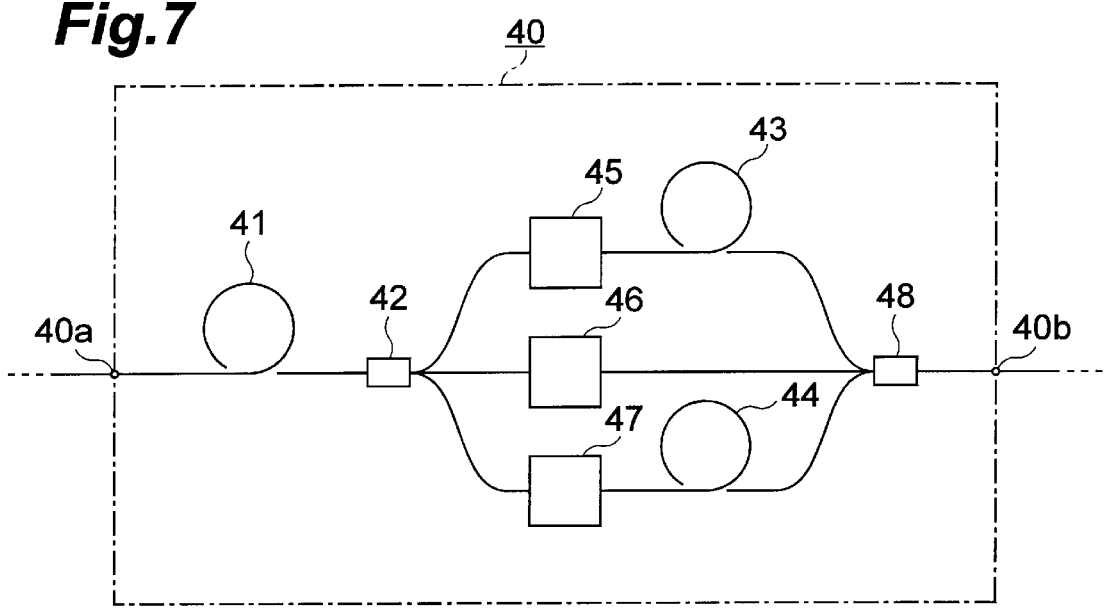
FIG. 7 is a view showing a schematic configuration of a fourth embodiment of the dispersion-compensating module according to the present invention.

A fourth embodiment of the dispersion-compensating module according to the present invention will now be explained. FIG. 7 is a view showing a schematic configuration of the fourth embodiment of the dispersion-compensating module according to the present invention. In this drawing, for simplifying the explanation, a case where WDM signals is constituted by three wavelengths of signal light components will be explained, whereas the three wavelengths will be referred to as $\lambda_1$, $\lambda_2$, and $\lambda_3$ ($\lambda_1 < \lambda_2 < \lambda_3$), respectively.

The dispersion-compensating module 40 according to the fourth embodiment also has an input end 40a and an output end 40b, and dispersion-compensating means and loss-equalizing means are disposed in an optical path between the input end 40a and the output end 40b while being optically connected to each other. In particular, the dispersion-compensating module 40 comprises a demultiplexer 42 for demultiplexing the WDM signals into the respective light signals, and a multiplexer 48 for multiplexing the respective light signals demultiplexed by the demultiplexer 42 and outputting thus multiplexed signal. Further, the dispersion-compensating module 40 comprises dispersion-compensating optical fibers 41, 43, and 44 as the dispersion-compensating means, and optical attenuators 45 to 47 as the loss-equalizing means.

Figure 3C:
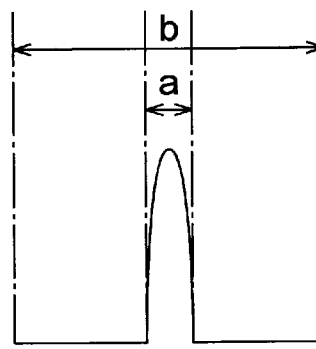

The dispersion-compensating optical fiber 41 is disposed on the input side of the demultiplexer 42 (between the input end 40a and the demultiplexer 42). In the fourth embodiment, as the dispersion-compensating optical fiber 41, one having a matched type refractive index profile (refractive index profile comprising a cladding region with a lower refractive index disposed around a core region having a higher refractive index at the center) as shown in FIG. 3C is employable. In this case, since single-mode optical fibers used as an optical transmission line in general have a positive wavelength dispersion slope, and the dispersion-compensating optical fiber 41 also has a positive wavelength dispersion slope, the dispersion-compensating optical fiber 41 can mainly compensate for the chromatic dispersion with respect to one wavelength (assumed to be the median wavelength $\lambda_2$ here) among the three wavelengths of signal light components. However, the dispersion-compensating optical fiber 41 cannot completely compensate for the chromatic dispersion with respect to each of the respective signal light components having the other wavelengths $\lambda_1$ and $\lambda_3$.

On the other hand, the WDM signals outputted from the dispersion-compensating optical fiber 41 is demultiplexed into the respective light signals by the demultiplexer 42. Then, the signal light component having the wavelength $\lambda_1$ successively propagates through the optical attenuator 45 and the dispersion-compensating optical fiber 43, thereby reaching the multiplexer 48. The signal light component having the wavelength $\lambda_2$ passes through the optical attenuator 46, thereby reaching the multiplexer 48. The signal light component having the wavelength $\lambda_3$ successively propagates through the optical attenuator 47 and the dispersion-compensating optical fiber 44, thereby reaching the multiplexer 48.

The dispersion-compensating optical fiber 43 is an optical device which compensates for the residual chromatic dispersion of the signal light component having the wavelength $\lambda_1$, whereas the dispersion-compensating optical fiber 44 is an optical device which compensates for the residual chromatic dispersion of the signal light component having the wavelength $\lambda_3$. Namely, the dispersion-compensating optical fibers 43 and 44 compensate for the residual chromatic dispersions that cannot completely be compensated for in the dispersion-compensating optical fiber 41 with respect to the light signals having the wavelengths $\lambda_1$ and $\lambda_3$, respectively. Here, for each of the dispersion-compensating optical fibers 43 and 44, one having a matched type refractive index profile (see FIG. 3C) is employable as well. The optical attenuators 45 to 47 adjust the respective optical powers of the light signals having the wavelengths $\lambda_1$ to $\lambda_3$, thereby flattening the respective optical powers of the three wavelengths of signal light components after they are multiplexed by the multiplexer 48.

In the dispersion-compensating module 40 of the fourth embodiment, as explained in the foregoing, the dispersion of the signal light component having the wavelength $\lambda_1$ is compensated for by the dispersion-compensating optical fibers 41 and 43, the dispersion of the signal light component having the wavelength $\lambda_2$ is compensated for by the dispersion-compensating optical fiber 41, and the dispersion of the signal light component having the wavelength $\lambda_3$ is compensated for by the dispersion-compensating optical fibers 41 and 44. Also, in the dispersion-compensating module 40, the optical attenuators 45 to 47 can adjust the respective optical powers of the light signals having the three wavelengths $\lambda_1$ to $\lambda_3$ thereby flattening the gain deviations and/or loss deviations among the respective light signals in total. Further, since this dispersion-compensating module 40 can employ, as the dispersion-compensating optical fibers 41, 43, and 44 included in the dispersion-compensating means, a dispersion-compensating optical fiber having a matched type refractive index profile which can be made at a lower cost as compared with the dispersion-compensating optical fiber having a W-shaped refractive index profile shown in FIG. 3B, it is preferable from the viewpoint of the manufacturing cost.

Here, in the fourth embodiment, various modes of connection are possible between the respective optical fibers. For example, the dispersion-compensating optical fiber 41 may be connected to the output side of the multiplexer 48 (between the output end 40b and the multiplexer 48). Also, instead of preparing the optical attenuators 45 to 47 for the respective wavelengths of the light signals, a single optical attenuator having a predetermined attenuation wavelength characteristic may be disposed on the input side of the demultiplexer 42 (between the entrance end 40a and the demultiplexer 42) or on the output side of the multiplexer 48.

Fifth Embodiment

Figure 8:
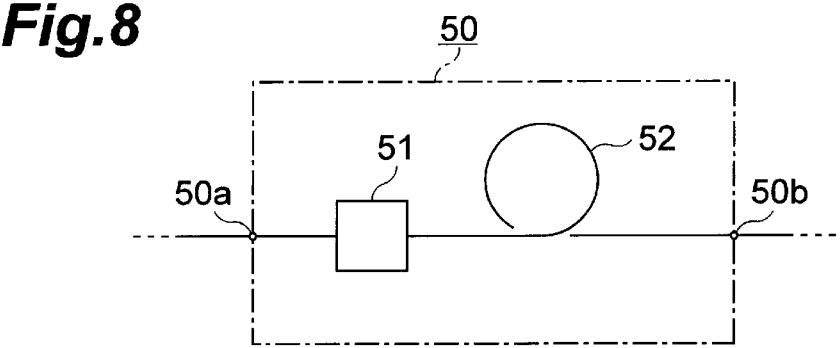
FIG. 8 is a view showing a schematic configuration of a fifth embodiment of the dispersion-compensating module according to the present invention.

Next, FIG. 8 is a view showing a schematic configuration of a fifth embodiment of the dispersion-compensating module according to the present invention. As in the foregoing first to fourth embodiments, the dispersion-compensating module 50 according to the fifth embodiment has an input end 50a and an output end 50b, and dispersion-compensating means and loss-equalizing means are disposed in an optical path between the input end 50a and the output end 50b while being optically connected to each other. In particular, this dispersion-compensating module 50 differs from that of the first embodiment in that a loss equalizer 51, as the loss-equalizing means, is disposed in front of a dispersion-compensating optical fiber 52 acting as the dispersion-compensating means (between the input end 50a and the dispersion-compensating optical fiber 52).

As in the first embodiment, the dispersion-compensating optical fiber 52 is an optical device which compensates for the chromatic dispersion in the wavelength band of the WDM signals in the optical transmission line in which the dispersion-compensating module 50 is inserted. On the other hand, the loss equalizer 51 is designed so as to compensate for the wavelength-dependent deviation of transmission loss in the dispersion-compensating optical fiber 52. Consequently, the total loss of the dispersion-compensating module 50 as a whole has a lower wavelength dependence as compared with the respective wavelength dependence characteristics of transmission loss in the loss equalizer 51 and the dispersion-compensating optical fiber 52.

Further, since the loss equalizer 51 is disposed in front of the dispersion-compensating optical fiber 52, the fifth embodiment also yields effects as follows. Namely, it is desirable that the optical power of the WDM signals inputted to the dispersion-compensating optical fiber 52 be not higher than a maximum permissible value, since nonlinear optical phenomena may occur in the dispersion-compensating optical fiber 52 and deteriorate the respective light signals if the optical power of the WDM signals inputted to the dispersion-compensating optical fiber 52 exceeds the maximum permissible value. In the fifth embodiment, since the loss equalizer is disposed in front of the dispersion-compensating optical fiber 52, the optical power of the WDM signals entering the dispersion-compensating module 50 by way of its entrance end 50a is permitted until it reaches the sum of the above-mentioned maximum permissible value and the value of loss in the loss equalizer 51. Therefore, in this embodiment, as compared with the above-mentioned first embodiment, the power margin of the WDM signals entering the dispersion-compensating module 50 by way of the entrance end 50a increases, so that the nonlinear optical phenomena are unlikely to occur in the dispersion-compensating optical fiber 52, whereby the WDM signals is kept from deteriorating.

Sixth Embodiment

Figure 9:
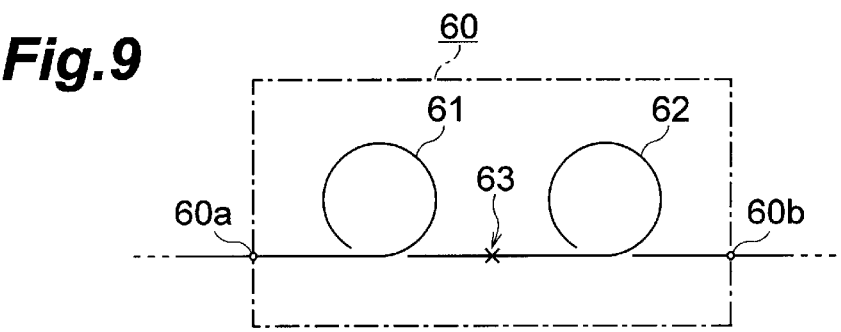
FIG. 9 is a view showing a schematic configuration of a sixth embodiment of the dispersion-compensating module according to the present invention.

A sixth embodiment of the dispersion-compensating module according to the present invention will now be explained. FIG. 9 is a view showing a schematic configuration of the sixth embodiment of the dispersion-compensating module according to the present invention.

As in the foregoing first to fifth embodiments, the dispersion-compensating module 60 according to the sixth embodiment has an input end 60a and an output end 60b, and dispersion-compensating means and loss-equalizing means are disposed in an optical path between the input end 60a and the output end 60b while being optically connected to each other. In particular, the dispersion-compensating module 60 is characterized in that a dispersion-compensating optical fiber 61 as the dispersion-compensating means and a loss-equalizing optical fiber 62 as the loss-equalizing means are fusion-spliced at a connecting portion 63.

The dispersion-compensating optical fiber 61 is an optical device which compensates for the chromatic dispersion in the wavelength band of the WDM signals in the optical transmission line in which the dispersion-compensating module 60 is inserted. On the other hand, the loss-equalizing optical fiber 62 is an optical fiber, basically similar to the optical fiber 300 shown in FIG. 3A, which comprises the core region 310 and the cladding region 320 disposed at the outer periphery of the core region 310, in which a transition metal such as Cr element, Co element, or the like is added into at least the core region 310. When the kind and amount of transition metal added to the core region 310 are appropriately selected, the wavelength-dependent loss deviation of the loss-equalizing optical fiber 62 is adjusted so as to compensate for the wavelength-dependent loss deviation of the dispersion-compensating optical fiber 61. Therefore, also in the dispersion-compensating module 60, the total loss as a whole would have a lower wavelength dependence as compared with the respective loss deviations of the dispersion-compensating optical fiber 61 and the loss-equalizing optical fiber 62.

Figure 10:
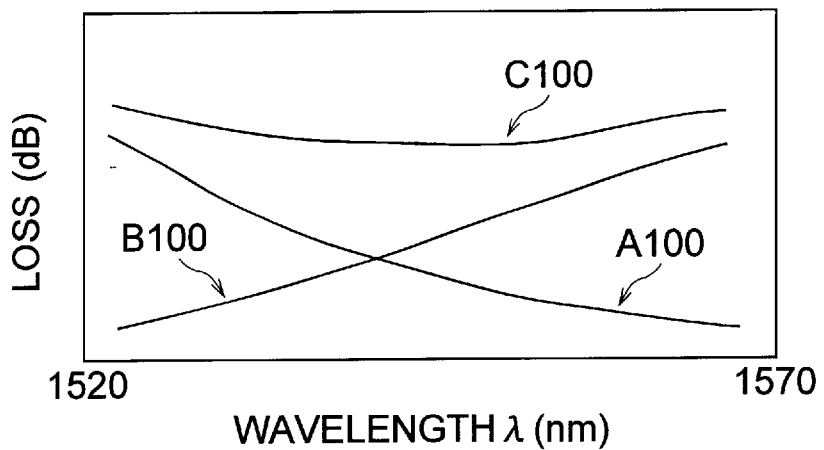
FIG. 10 is a graph showing the relationship between transmission loss and wavelength in the dispersion-compensating module according to the sixth embodiment shown in FIG. 9.

FIG. 10 is a graph showing relationships between transmission loss and wavelength in the dispersion-compensating module according to the sixth embodiment shown in FIG. 9. Here, in the graph, the curve indicated by A100 shows the relationship between transmission loss and wavelength in the dispersion-compensating optical fiber 61, the curve indicated by B100 shows the relationship between transmission loss and wavelength in the loss-equalizing optical fiber 62, and the curve indicated by C100 shows the relationship between transmission loss and wavelength in the dispersion-compensating module 60 including the dispersion-compensating optical fiber 61 and the loss-equalizing optical fiber 62.

As can also be seen from this graph, the transmission loss of the dispersion-compensating optical fiber (DCF) 61 is smaller as wavelength is longer in the 1.55-$\mu$m wavelength band in general. On the other hand, the loss-equalizing optical fiber 62 is a single-mode optical fiber whose core region is doped with Co element at a concentration of about 10 ppm, and is designed such that its transmission loss becomes greater as wavelength is longer and that it can compensate for the wavelength-dependent loss deviation of the dispersion-compensating optical fiber 61. The total loss of the dispersion-compensating module 60 according to the sixth embodiment as a whole is the sum of the respective transmission loss values of the dispersion-compensating optical fiber 61 and the loss-equalizing optical fiber 62, so that the deviation of loss within the wavelength range of 1520 nm to 1570 nm becomes 0.1 dB or less (the wavelength dependence is smaller as compared with the individual constituent).

Seventh Embodiment

Figure 11:
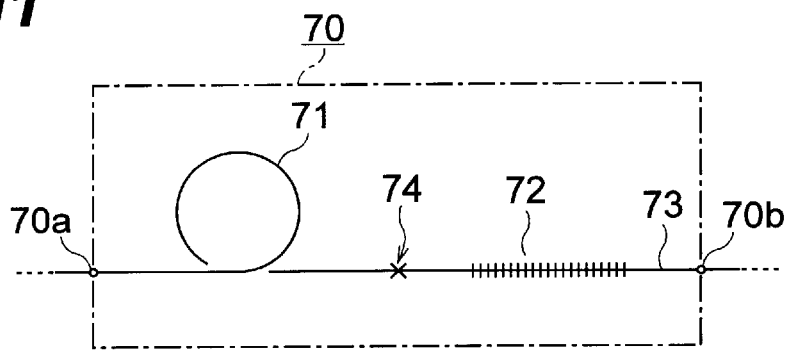
FIG. 11 is a view showing a schematic configuration of a seventh embodiment of the dispersion-compensating module according to the present invention.

A seventh embodiment of the dispersion-compensating module according to the present invention will now be explained. FIG. 11 is a view showing a schematic configuration of the seventh embodiment of the dispersion-compensating module according to the present invention.

As in the foregoing first to sixth embodiments, the dispersion-compensating module 70 according to the seventh embodiment has an input end 70a and an output end 70b, and dispersion-compensating means and loss-equalizing means are disposed in an optical path between the input end 70a and the output end 70b while being optically connected to each other. In particular, the dispersion-compensating module 70 is characterized in that a dispersion-compensating optical fiber 71 as the dispersion-compensating means and an optical fiber 73 formed with a long-period fiber grating 72 as the loss-equalizing means are fusion-spliced at a connecting portion 74. Here, the optical fiber 73 is preferably a single-mode optical fiber having a zero-dispersion wavelength in the 1.3-$\mu$m wavelength band or a dispersion-compensating optical fiber.

The dispersion-compensating optical fiber 71 is an optical device which compensates for the chromatic dispersion in the wavelength band of the WDM signals in the optical transmission line in which the dispersion-compensating module 70 is inserted. The long-period fiber grating 72 is obtained by generating a predetermined period of refractive index change at least in the core region of the optical fiber 73, the period of refractive index change being a long period on the order of several hundreds of micrometers, and couples a propagation mode which is a mode in which light propagates through the core region and a radiation mode which is a mode in which light is emitted to the cladding region. The long-period fiber grating 72 is designed, by appropriately selecting the period and length of its refractive index change, such that, for example, the transmission loss at a wave length of 1520 nm is minimized, whereas the transmission loss at a wavelength of 1570 nm is maximized, so as to compensate for the wavelength-dependent loss deviation of the dispersion-compensating optical fiber 71.

Therefore, the total loss of the dispersion-compensating module 70 according to the seventh embodiment as a whole would have a lower wavelength dependence as compared with the respective loss deviations of the dispersion-compensating optical fiber 71 and long-period fiber grating 72. When the long-period fiber grating 72 is thus used as the loss-equalizing means, the loss deviations among the respective light signals can be flattened without greatly lowering the total transmission loss of the dispersion-compensating module 70. Also, desirable transmission characteristics can easily be obtained in a wide wavelength band. Here, the long-period fiber grating 72 is an optical component which is clearly distinguished from a short-period fiber grating which reflects only a predetermined wavelength of signal light component.

Figure 12:
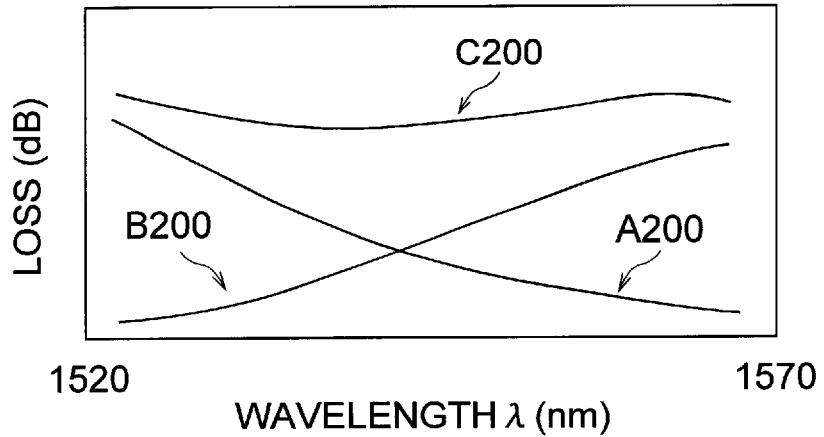
FIG. 12 is a graph showing the relationship between transmission loss and wavelength in the dispersion-compensating module according to the seventh embodiment shown in FIG. 11.

FIG. 12 is a graph showing relationships between transmission loss and wavelength in the dispersion-compensating module according to the seventh embodiment shown in FIG. 11. Here, in the graph, the curve indicated. by A200 shows the relationship between transmission loss and wavelength in the dispersion-compensating optical fiber 71, the curve indicated by B200 shows the relationship between transmission loss and wavelength in the long-period fiber grating 72, and the curve indicated by C200 shows the relationship between transmission loss and wavelength in the dispersion-compensating module 70 including the dispersion-compensating optical fiber 71 and the long-period fiber grating 72.

As can also be seen from this graph, the transmission loss of the dispersion-compensating optical fiber (DCF) 71 is smaller as wavelength is longer in the 1.55-$\mu$m wavelength band in general. On the other hand, the long-period fiber grating (long-period FG) 72 is designed such that its transmission loss becomes greater as wavelength is longer and that it can compensate for the wavelength-dependent loss deviation of the dispersion-compensating optical fiber 71. Also, the total loss of the dispersion-compensating module 70 according to the seventh embodiment as a whole is the sum of the respective transmission loss values of the dispersion-compensating optical fiber 71 and the long-period fiber grating 72, so that the deviation of transmission loss within the wavelength range of 1520 nm to 1570 nm becomes 0.1 dB or less.

Eighth Embodiment

Figure 13:
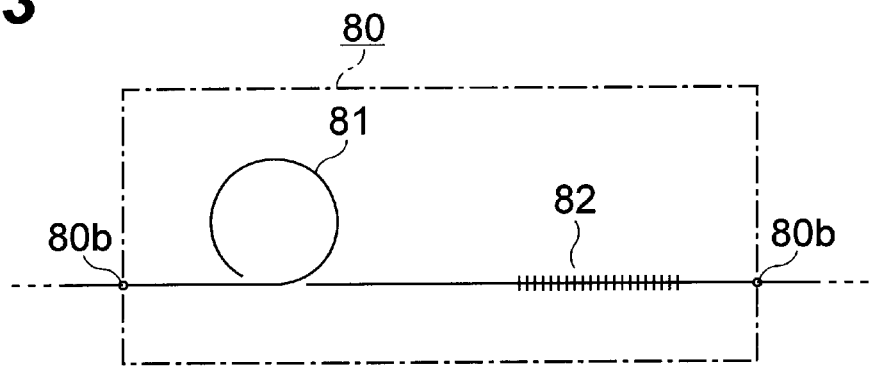
FIG. 13 is a view showing a schematic configuration of an eighth embodiment of the dispersion-compensating module according to the present invention.

An eighth embodiment of the dispersion-compensating module according to the present invention will now be explained. FIG. 13 is a view showing a schematic configuration of the eighth embodiment of the dispersion-compensating module according to the present invention.

As in the foregoing first to seventh embodiments, the dispersion-compensating module 80 according to the eighth embodiment has an input end 80a and an output end 80b, and dispersion-compensating means and loss-equalizing means are disposed in an optical path between the input end 80a and the output end 80b while being optically connected to each other. In particular, the dispersion-compensating module 80 is characterized in that it comprises a dispersion-compensating optical fiber 81 as the dispersion-compensating means, and the dispersion-compensating optical fiber 81 is directly formed with a long-period fiber grating 82 as the loss-equalizing means.

The dispersion-compensating optical fiber 81 is an optical device which compensates for the chromatic dispersion in the wavelength band of the WDM signals in the optical transmission line in which the dispersion-compensating module 80 is inserted. The long-period fiber grating 82 is obtained by generating a predetermined period. of refractive index change at least in the core region of the dispersion-compensating optical fiber 81, the period of refractive index change being a long period on the order of several hundreds of micrometers, and couples a propagation mode which is a mode in which light propagates through the core region and a radiation mode which is a mode in which light is emitted to the cladding region. The long-period fiber grating 82 is designed, by appropriately selecting the period and length of its refractive index change, such that, for example, the transmission loss at a wavelength of 1520 nm is minimized, whereas the transmission loss at a wavelength of 1570 nm is maximized, so as to compensate for the wavelength-dependent loss deviation of the dispersion-compensating optical fiber 81.

Therefore, the total loss of the dispersion-compensating module 80 according to the eighth embodiment as a whole is also the total of the respective loss deviations caused by the dispersion-compensating optical fiber 81 and the formed long-period fiber grating 82, and would have a lower wavelength dependence as a whole. When the long-period fiber grating 82 is thus used as the loss-equalizing means, the loss deviations among the respective light signals can be flattened without greatly lowering the total transmission loss of the dispersion-compensating module 80. Also, desirable transmission characteristics can easily be obtained in a wide wavelength band. Since the dispersion-compensating optical fiber 81 is directly formed with the long-period fiber grating 82 as the loss-equalizing means, there is no connecting portion which may generate loss, whereby it is also unnecessary to consider the influence of loss in the connecting portion in the eighth embodiment.

Figure 14:
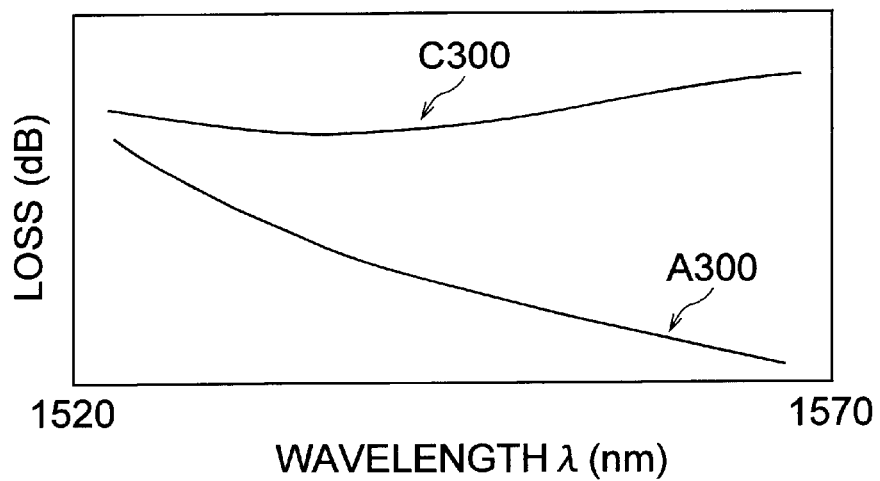
FIG. 14 is a graph showing the relationship between transmission loss and wavelength in the dispersion-compensating module according to the eighth embodiment shown in FIG. 13.

On the other hand, FIG. 14 is a graph showing relationships between transmission loss and wavelength in the dispersion-compensating module 80 according to the eighth embodiment shown in FIG. 13. Here, in the graph, the curve indicated by A300 shows the relationship between transmission loss and wavelength in the dispersion-compensating optical fiber 81 before the long-period fiber grating 82 is formed, and the curve indicated by C300 shows the relationship between transmission loss and wavelength in the dispersion-compensating optical fiber 81 after the long-period fiber grating 82 is formed.

As can also be seen from this graph, the original transmission loss of the dispersion-compensating optical fiber (DCF) 81 before the formation of the long-period fiber grating 82 is smaller as wavelength is longer in the 1.55-$\mu$m wavelength band in general. On the other hand, the transmission loss of the long-period fiber grating 82 is designed such that its transmission loss becomes greater as wavelength is longer and that it can compensate for the original loss deviation of the dispersion-compensating optical fiber 81 among the respective light signals. The total loss of the dispersion-compensating optical fiber 81 formed with the long-period fiber grating 82, i.e., the dispersion-compensating module 80 as a whole, is the sum of the original transmission loss of the dispersion-compensating optical fiber 81 and the transmission loss of the long-period fiber grating 82, so that the deviation of transmission loss within the wavelength range of 1520 nm to 1570 nm becomes 0.1 dB or less.

Ninth Embodiment

Figure 15A:
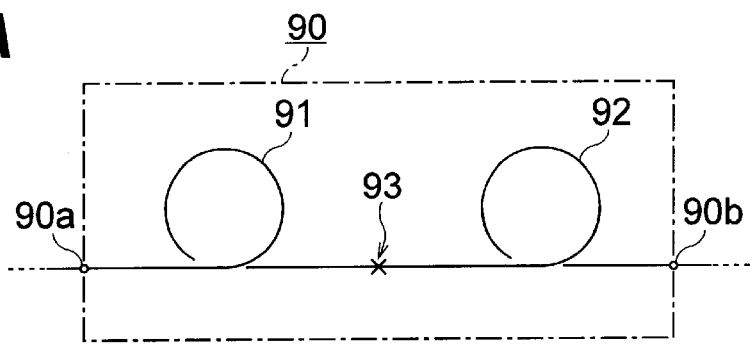
Figure 15B:
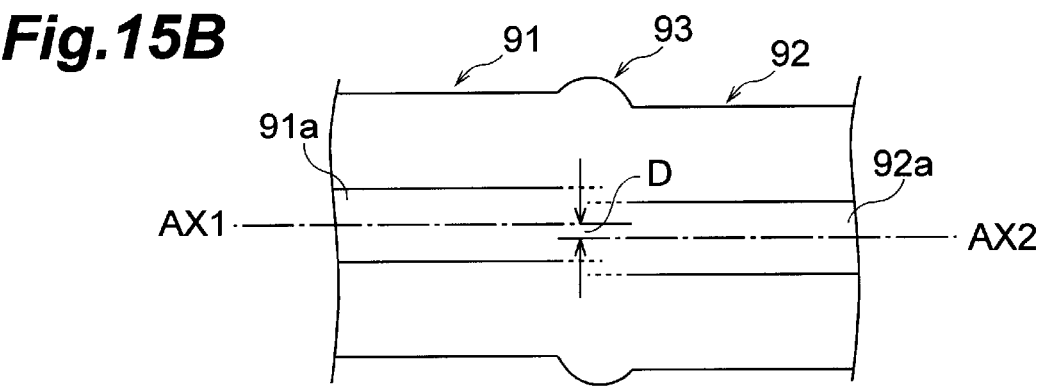
Figure 15C:
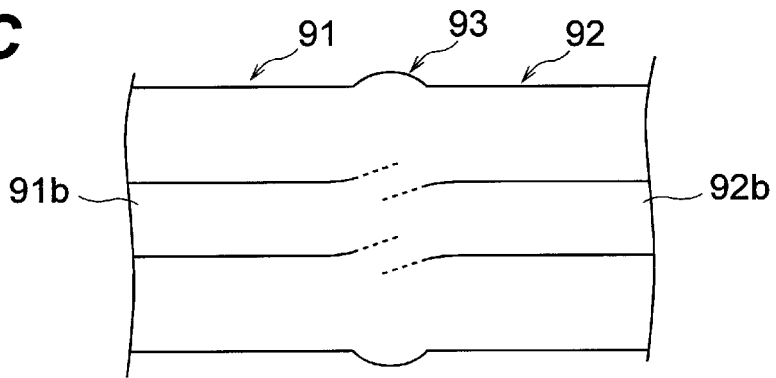
Figure 15D:
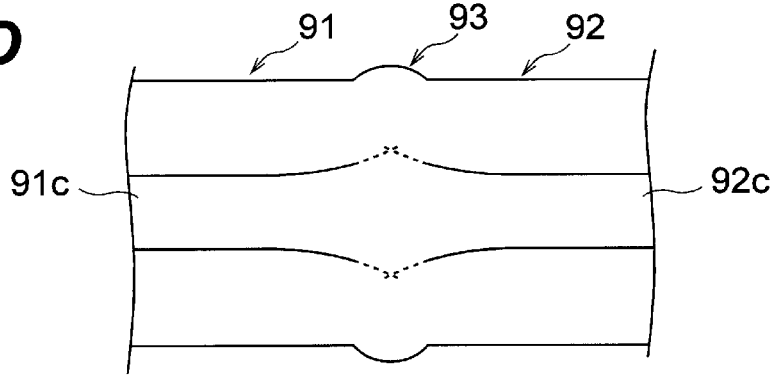

A ninth embodiment of the dispersion-compensating module according to the present invention will now be explained. FIGS. 15A to 15D are views showing the ninth embodiment of the dispersion-compensating module according to the present invention and its specific examples, in which FIG. 15A is a view showing a schematic configuration of the ninth embodiment, FIG. 15B is a view showing a first specific example of the ninth embodiment, FIG. 15C is a view showing a second specific example of the ninth embodiment, and FIG. 15D is a view showing a third specific example of the ninth embodiment.

The dispersion-compensating module 90 according to the ninth embodiment is characterized in that a dispersion-compensating optical fiber 91 as dispersion-compensating means and a single-mode optical fiber 92 are fusion-spliced at a fused portion 93.

In this configuration, the dispersion-compensating optical fiber 91 is an optical device which compensates for the chromatic dispersion in the signal light wavelength band of an optical transmission line in which the dispersion-compensating module 90 is inserted. Though the fused portion 93 yields a loss, its wavelength characteristic varies depending on such conditions as the heating temperature at the time of fusion-splicing, the amount of insertion of the fiber, and the like, whereby the wavelength dependence of the transmission loss in the fused portion 93 can be adjusted if the fusion conditions are set appropriately.

A specific structure of the fused portion 93 can be realized when the core region 91$a$ of the dispersion-compensating optical fiber 91 and the core region 92$a$ of the single-mode optical fiber 92 are fused together while their optical axes AX1, AX2 are deviated from each other by a predetermined distance D as shown in FIG. 15B, for example. Also, it can be realized when the dispersion-compensating optical fiber 91 and the single-mode optical fiber 92 are fusion-spliced together while minute bending is imparted to each of the core region 91$b$ of the dispersion-compensating optical fiber 91 and the core region 92$b$ of the single-mode optical fiber 92 as shown in FIG. 15C. Further, as shown in FIG. 15D, the core region 91$c$ of the dispersion-compensating optical fiber 91 and the core region 92$c$ of the single-mode optical fiber 92 may be configured so as to increase their diameters toward the fused portion 93. Here, the above-mentioned specific examples can be employed in any combination, for example, such that a structure for increasing each bending diameter of the core regions or bending the core regions may be combined in the fused portion 93. In any of these cases, the dispersion-compensating module 90 as a whole would have a deviation of 0.1 dB or less in its total loss within the wavelength range of 1520 nm to 1570 nm.

Figure 16:
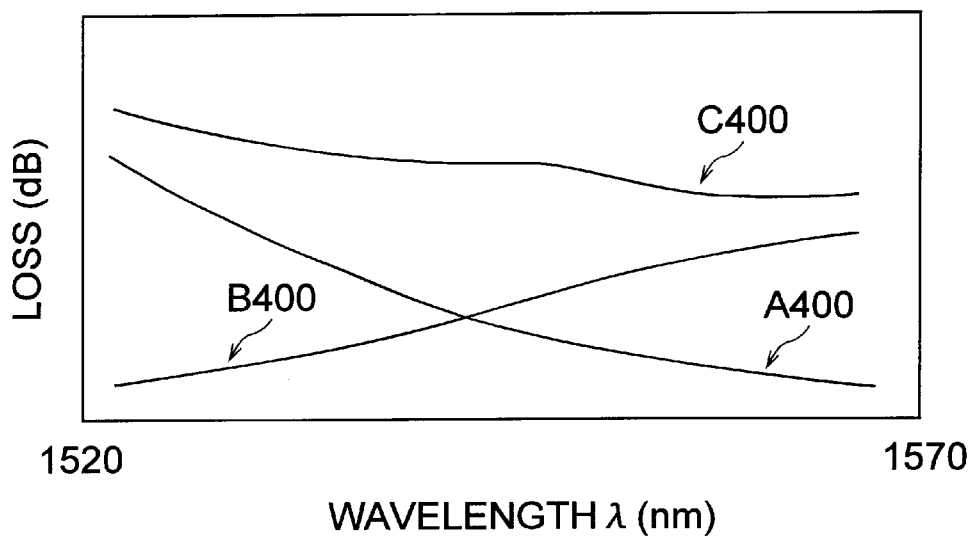
FIGS. 16 and 17 are graphs showing relationships between transmission loss and wavelength in the dispersion-compensating modules according to the ninth embodiment shown in FIGS. 15A to 15D.

FIG. 16 is a graph showing relationships between transmission loss and wavelength in the dispersion-compensating module according to the ninth embodiment. As can also be seen from this graph, the transmission loss of the dispersion-compensating optical fiber (DCF) 91 is smaller as wavelength is longer in the 1.55-$\mu$m wavelength band in general. On the other hand, the transmission loss of the fused portion 93 is designed such that it is greater as wavelength is longer, thereby being able to compensate for the wavelength-dependent loss deviation of the dispersion-compensating optical fiber 91. The total loss of the dispersion-compensating module 90 as a whole is the sum of the respective transmission loss values of the dispersion-compensating optical fiber 91, the single-mode optical fiber 92, and the fused portion 93, so that the deviation of loss within the wavelength range of 1520 nm to 1570 nm becomes 0.1 dB or less.

The loss deviation in the fused portion 93 also depends on the amounts of misalignment of optical axis between the dispersion-compensating optical fiber 91 and the single-mode optical fiber 92 in the fused portion 93, and can also be adjusted when the amount of misalignment is appropriately set at the time of fusion-splicing as shown in FIG. 15B. Here, in FIG. 16, the curve indicated by the arrow A400 shows the relationship between wavelength and transmission loss in the dispersion-compensating optical fiber 91, the curve indicated by the arrow B400 shows the relationship between wavelength and transmission loss in the fused portion 93 between the dispersion-compensating optical fiber 91 and the single-mode optical fiber 92, and the arrow C400 shows the relationship between wavelength and transmission loss in the dispersion-compensating module 90 of the ninth embodiment as a whole.

Figure 17:
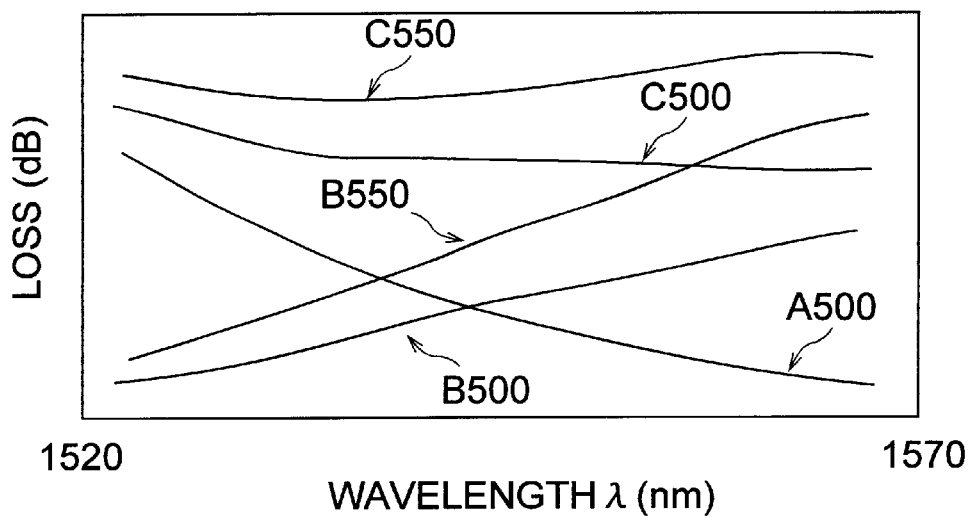

FIG. 17 is a graph showing relationships between wavelength and transmission loss in the dispersion-compensating module 90 in the case where the dispersion-compensating optical fiber 91 and the single-mode optical fiber 92 are fusion-spliced while their optical axes are deviated from each other (see FIG. 15B). In the graph, the curve indicated by the arrow A500 shows the relationship between wavelength and transmission loss in the dispersion-compensating optical fiber 91. On the other hand, the curve indicated by the arrow B500 shows the relationship between wavelength and transmission loss in a fused portion A where the amount of misalignment of optical axis D is a first value, the curve indicated by the arrow C500 shows the relationship between wavelength and transmission loss in the whole dispersion-compensating module 90 having the fused portion A, the curve indicated by the arrow B550 shows the relationship between wavelength and transmission loss in a fused portion B where the amount of misalignment of optical axis D is a second value different from the first value, and the curve indicated by the arrow C550 shows the relationship between wavelength and transmission loss in the whole dispersion-compensating module 90 having the fused portion B.

As can also be seen from FIG. 17, when the amount of misalignment of the optical axes AX1, AX2 varies in the fusion-splicing between the core region 91a of the dispersion-compensating optical fiber 91 and the core region 92b of the single-mode optical fiber 92, the relationship between wavelength and transmission loss in the dispersion-compensating module 90 as a whole would greatly fluctuate. When the amount of misalignment of optical axis D in the fused portion 93 is thus appropriately set, then the dispersion-compensating module 90 as a whole would have a loss deviation of 0.1 dB or less within the wavelength range of 1520 nm to 1570 nm.

Here, though the fusion-splicing between the dispersion-compensating optical fiber 91 and the single-mode optical fiber 92 is explained in the ninth embodiment, the configuration of the fused portion 93 is not restricted thereto. For example, a single-mode optical fiber may be employed in place of the dispersion-compensating optical fiber 91, and a dispersion-compensating optical fiber or other optical fibers may be employed in place of the single-mode optical fiber 92. In any case, by adjusting the wavelength. dependence of transmission loss in the fused portion therebetween, the wavelength dependence of the whole dispersion-compensating module can be lowered.

Tenth Embodiment

Figure 18:
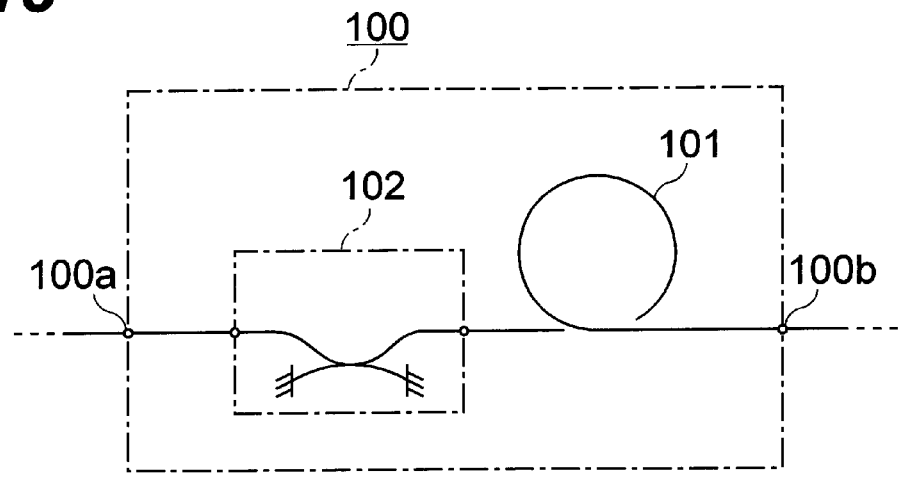
FIG. 18 is a view showing a schematic configuration of a tenth embodiment of the dispersion-compensating module according to the present invention.

A tenth embodiment of the dispersion-compensating module according to the present invention will now be explained. FIG. 18 is a view showing a schematic configuration of the tenth embodiment of the dispersion-compensating module according to the present invention.

In the dispersion-compensating module 100 according to the tenth embodiment, as in the fifth embodiment (FIG. 8), dispersion-compensating means and loss-equalizing means are disposed in an optical path between an input end 100a and an output end 100b while being optically connected to each other. Specifically, the tenth embodiment comprises a dispersion-compensating optical fiber 101 as the dispersion-compensating means and a fiber fusion type coupler (WDM coupler) 102 as the loss-equalizing means. The WDM coupler 102 is characterized in that it has a polarization-dependent loss (PDL) of 0.2 dB or less.

Figure 19:
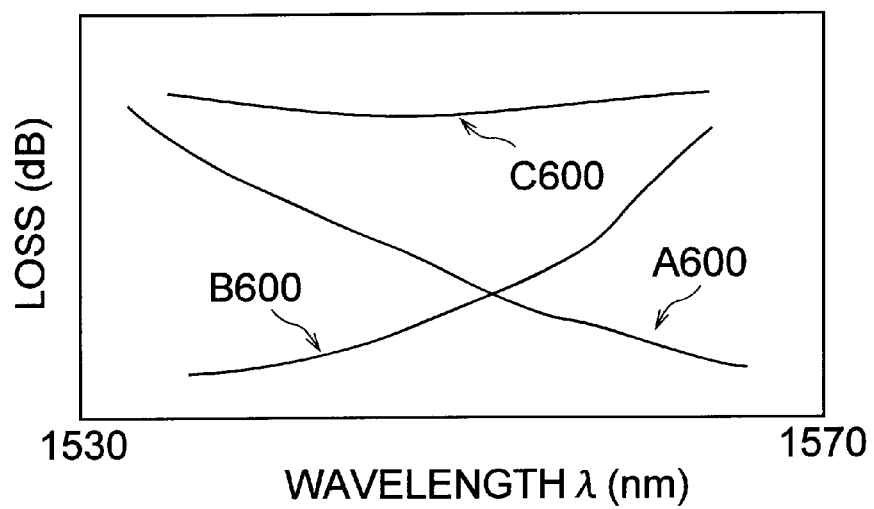
FIG. 19 is a graph showing the relationship between transmission loss and wavelength in the dispersion-compensating module according to the tenth embodiment shown in FIG. 18.

The dispersion-compensating optical fiber 101 has such a wavelength dependence that, as in the curve indicated by the arrow A600 in FIG. 19, transmission loss increases as wavelength is longer. On the other hand, as in the curve indicated by the arrow B600 in FIG. 19, the transmission loss in the WDM coupler 102 increases as wavelength is shorter. Hence, the total loss of the dispersion-compensating module 100 constituted by the dispersion-compensating optical fiber 101 and the WDM coupler 102 is also the total of the respective transmission loss values of these members 101 and 102, whereby the wavelength dependence becomes lower as a whole as can also be seen from the curve indicated by the arrow C600 in FIG. 19.

Figure 20A:
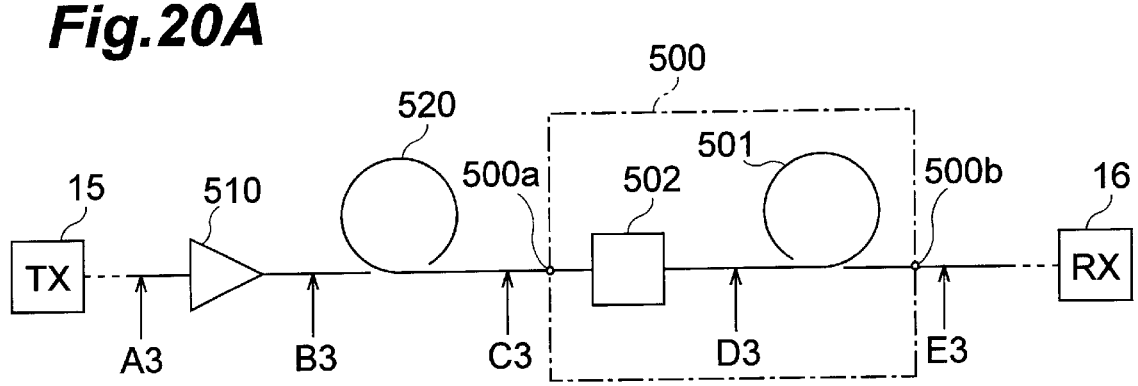

Here, FIG. 20A is a view showing a whole optical transmission system to which a dispersion-compensating module according to the present invention is applied. In this optical transmission system, in a transmission line between a transmitting station 15 and a receiving station 16, at least an optical amplifier 510 as a repeater, a single-mode optical fiber 520 constituting a part of the transmission line, and a dispersion-compensating module 500 according to the present invention are arranged. For constituting at least a part of the transmission line, the dispersion-compensating module 500 applied to this optical transmission system comprises an input end 500a and an output end 500b for WDM signals, whereas a dispersion-compensating optical fiber 501 and a loss equalizer 502 which are optically connected to each other are disposed in the optical path between the input end 500a and the output end 500b. In the optical transmission system having such a configuration, any of the dispersion-compensating modules 10 to 100 in the above-mentioned first to tenth embodiments can be employed in place of the dispersion-compensating module 500. Also, in such a configuration, the object to be compensated for by the dispersion-compensating optical fiber 501 may be not only the single-mode optical fiber 520 constituting a part of the transmission line, but also the whole optical transmission line (e.g., including the optical amplifier 510 and the like). While the object to be compensated for by the loss equalizer 502 is at least the dispersion-compensating optical fiber 501, without being restricted thereto, the loss equalizer 502 may be designed so as to compensate for the wavelength-dependent loss deviation of the optical amplifier 510 as well, for example.

Figure 20B:
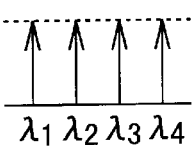
Figure 20C:
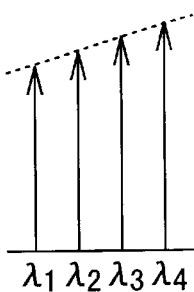
Figure 20D:
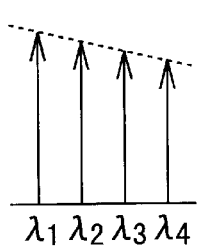
Figure 20E:
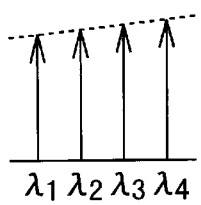
Figure 20F:
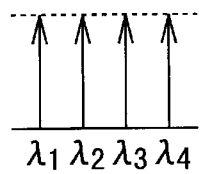

Here, FIG. 20B shows the WDM signals (wavelengths $\lambda_1$ to $\lambda_4$) at a location indicated by the arrow A3 in the optical transmission system shown in FIG. 20A. Also, FIG. 20C shows the WDM signals at the arrow B3, FIG. 20D shows the WDM signals at a location indicated by the arrow C3, FIG. 20E shows the WDM signals at a location indicated by the arrow D3, and FIG. 20F shows the WDM signals at a location indicated by the arrow E3. As can also be seen from these charts, since the wavelength dependence characteristic of transmission loss in the optical amplifier 510 and the wavelength dependence characteristic of transmission loss in the dispersion-compensating optical fiber 501 are opposite to each other, the optical transmission system as a whole can lower its wavelength dependence.

Further, in the dispersion-compensating module according to the present invention, it is preferred that, of the single light components emitted from the above-mentioned exit end, at least those having their center wavelength within the wavelength range of 1530 nm to 1565 nm have an optical power deviation of 0.5 dB or less therebetween. It is because of the fact that favorable transmission characteristics can be expected over several hundreds of kilometers if the optical power deviations among the light signals are suppressed to the above-mentioned value or less in a wavelength band used in a normal erbium-doped fiber amplifier (EDFA).

Also, in the WDM transmission in a 1580-nm band, of the light signals emitted from the above-mentioned exit end, at least those having their center wavelength within the wavelength range of 1560 nm to 1600 nm preferably have an optical power deviation of 0.5 dB or less therebetween. It is because of the fact that favorable transmission characteristics can be expected over several hundreds of kilometers if this condition is satisfied.

In particular, in the long-distance optical transmission beyond 1000 km, of the light signals emitted from the above-mentioned exit end, at least those having their center wavelength within the wavelength range of 1535 nm to 1560 nm preferably have an optical power deviation of 0.5 dB or less therebetween; and further, of the light signals emitted from the above-mentioned exit end, at least those having their center wavelength within the wavelength range of 1575 nm to 1595 nm preferably have an optical power deviation of 0.5 dB or less therebetween.

For yielding a favorable transmission characteristic with a BER (Bit Error Ratio) of $10^{-15}$ or less in the high-speed transmission of 10 gigabits/sec or faster in the long-distance optical transmission beyond 1000 km, on the other hand, of the light signals emitted from the above-mentioned exit end, at least those having their center wavelength within the wavelength range of 1550 nm to 1560 nm preferably have an optical power deviation of 0.2 dB or less therebetween; and further, of the light signals emitted from the above-mentioned exit end, at least those having their center wavelength within the wavelength range of 1575 nm to 1585 nm preferably have an optical power deviation of 0.2 dB or less therebetween.

Also, without being restricted to the above-mentioned embodiments, the present invention can be implemented in various manners. For example, the dispersion-compensating means and the loss-equalizing means can be connected in any order in each embodiment. However, as explained in the fifth embodiment, the case where the loss-equalizing means is disposed in front of the dispersion-compensating means is preferable in that the permissible value of incident optical power in the dispersion-compensating module can be enhanced.

In the dispersion-compensating module according to the present invention, as explained in detail in the foregoing, the chromatic dispersion in a predetermined wavelength band occurring in an optical transmission line is compensated for by dispersion-compensating means, whereas at least the wavelength-dependent loss deviation in the dispersion-compensating means is compensated for by loss-equalizing means optically connected to the dispersion-compensating means. Namely, according to the present invention, not only the chromatic dispersion of the optical transmission line is compensated for, but also the wavelength dependence of the loss deviation in the whole dispersion-compensating module can be lowered, so that the optical power deviation between signal light components included in the WDM signals propagating through the optical transmission line becomes smaller, and respective light signals reach a receiving station with a sufficient optical power and a favorable S/N ratio, whereby no reception error would occur in the receiving station. Further, it is effective in that, when the dispersion-compensating module according to the present invention is to be inserted into the optical transmission line, it is unnecessary to redesign the whole optical transmission line, and it is unnecessary to adjust characteristics of optical amplifiers, loss equalizers, and the like which have already been installed in the optical transmission line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating module having an input end into which light of one or more light signals whose respective center wavelengths are included in a predetermined wavelength band are inputted, and an output end from which said light signals exit, thereby constituting a part of an optical transmission line through which said light signals propagate, said dispersion-compensating module comprising:

dispersion-compensating means which is disposed in an optical path between said input end and said output end and which has a positive dispersion slope; and loss-equalizing means which is disposed in the optical path between said input end and said dispersion-compensating means and which can compensate for at least wavelength-dependent loss deviations of said dispersion-compensating means.

2. A dispersion-compensating module according to claim 1, further comprising optical amplifying means which is disposed in the optical path between said input end and said output end, for amplifying said light signals inputted by way of said input end, wherein said loss-equalizing means compensates for at least the wavelength-dependent loss deviations of said dispersion-compensating means and gain deviations of said optical amplifying means.

3. A dispersion-compensating module according to claim 1, further comprising a demultiplexer for demultiplexing said light signals and a multiplexer for multiplexing respective light signals demultiplexed by said demultiplexer, wherein said dispersion-compensating means is provided in at least one of an optical path between said input end and said demultiplexer, an optical path between said demultiplexer and said multiplexer, and an optical path between said multiplexer and said output end, and wherein said loss-equalizing means is provided in the optical path between said input end and said dispersion-compensating means and adjusts an optical power of said demultiplexed light signals.

4. A dispersion-compensating module according to claim 1, wherein said loss-equalizing means includes a loss-equalizing optical fiber having a core region doped with a transition metal and a cladding region provided on the outer periphery of said core region.

5. A dispersion-compensating module according to claim 1, wherein said loss-equalizing means includes an optical fiber with a long-period fiber grating for coupling a propagation mode and a radiation mode.

6. A dispersion-compensating module according to claim 1, wherein said loss-equalizing means includes at least one of a single-mode optical fiber having a zero-dispersion wavelength in a 1.3-$\mu$m wavelength band and a dispersion-compensating optical fiber, and wherein, in said dispersion-compensating means, a long-period fiber grating for coupling a propagation mode and a radiation mode is provided as said loss-equalizing means.

7. A dispersion-compensating module according to claim 1, wherein said loss-equalizing means includes a fiber coupler.

8. A dispersion-compensating module according to claim 7, wherein said fiber coupler has a polarization-dependent loss of 0.2 dB or less.

9. A dispersion-compensating module according to claim 1, wherein said loss-equalizing means includes a fused portion obtained by fusion-splicing respective end portions of a pair of optical fibers.

10. A dispersion-compensating module according to claim 9, wherein said pair of optical fibers are fusion-spliced at said fused portion while respective optical axes thereof are deviated from each other.

11. A dispersion-compensating module according to claim 9, wherein said pair of optical fibers are fusion-spliced at said fused portion while respective core regions thereof are bent.

12. A dispersion-compensating module according to claim 9, wherein said fusion-spliced pair of optical fibers each have a core region whose diameter increases toward said fused portion.

13. A dispersion-compensating module according to claim 1, wherein, of the light signals outputted from said output end, at least light signals each having a center wavelength thereof in the wavelength range of 1530 nm to 1565 nm have an optical power deviation of 0.5 dB or less therebetween.

14. A dispersion-compensating module according to claim 1, wherein, of the light signals outputted from said output end, at least light signals each having a center wavelength thereof in the wavelength range of 1560 nm to 1600 nm have an optical power deviation of 0.5 dB or less therebetween.

15. A dispersion-compensating module according to claim 1, wherein, of the light signals outputted from said output end, at least light signals each having a center wavelength thereof in the wavelength range of 1535 nm to 1560 nm have an optical power deviation of 0.5 dB or less therebetween.

16. A dispersion-compensating module according to claim 1, wherein, of the light signals outputted from said output end, at least light signals each having a center wavelength thereof in the wavelength range of 1575 nm to 1595 nm have an optical power deviation of 0.5 dB or less therebetween.

17. A dispersion-compensating module according to claim 1, wherein, of the light signals outputted from said output end, at least light signals each having a center wavelength thereof in the wavelength range of 1550 nm to 1560 nm have an optical power deviation of 0.2 dB or less therebetween.

18. A dispersion-compensating module according to claim 1, wherein, of the light signals outputted from said output end, at least light signals each having a center wavelength thereof in the wavelength range of 1575 nm to 1585 nm have an optical power deviation of 0.2 dB or less therebetween.

19. A dispersion-compensating module comprising an input end into which light of one or more light signals whose respective center wavelengths are included in a predetermined wavelength band are inputted, and an output end from which said light signals are outputted, thereby constituting a part of an optical transmission line through which said light signals propagate, said dispersion-compensating module comprising:

dispersion-compensating means which is disposed in an optical path between said input end and said output end and which has a negative dispersion slope; and loss-equalizing means which is disposed in the optical path between said input end and said dispersion-compensating means and which can compensate for at least wavelength-dependent loss deviations of said dispersion-compensating means.

20. A dispersion-compensating module according to claim 19, further comprising optical amplifying means which is disposed in the optical path between said input end and said output end, for amplifying said light signals inputted by way of said input end, wherein said loss-equalizing means compensates for at least the wavelength-dependent loss deviations of said dispersion-compensating means and gain deviations of said optical amplifying means.

21. A dispersion-compensating module according to claim 19, further comprising a demultiplexer for demultiplexing said light signals and a multiplexer for multiplexing respective light signals demultiplexed by said demultiplexer, wherein said dispersion-compensating means is disposed in at least one of an optical path between said input end and said demultiplexer, an optical path between said demultiplexer and said multiplexer, and an optical path between said multiplexer and said output end, and wherein said loss-equalizing means is disposed in the optical path between said input end and said dispersion-compensating means and adjusts an optical power of said demultiplexed light signals.

22. A dispersion-compensating module according to claim 19, wherein said loss-equalizing means includes a loss-equalizing optical fiber having a core region doped with a transition metal and a cladding region provided on the outer periphery of said core region.

23. A dispersion-compensating module according to claim 19, wherein said loss-equalizing means includes an optical fiber formed with a long-period fiber grating for coupling a propagation mode and a radiation mode.

24. A dispersion-compensating module according to claim 19, wherein said loss-equalizing means includes at least one of a single-mode optical fiber having a zero-dispersion wavelength in a 1.3-$\mu$m wavelength band and a dispersion-compensating optical fiber, and wherein, in said disersion-comensating means, a long-period fiber grating for coupling a propagation mode and a radiation mode is provided as said loss-equalizing means.

25. A dispersion-compensating module according to claim 19, wherein said loss-equalizing means includes a fiber coupler.

26. A dispersion-compensating module according to claim 25, wherein said fiber coupler has a polarization-dependent loss of 0.2 dB or less.

27. A dispersion-compensating module according to claim 19, wherein said loss-equalizing means includes a fused portion obtained by fusion-splicing respective end portions of a pair of optical fibers.

28. A dispersion-compensating module according to claim 27, wherein said pair of optical fibers are fusion-spliced at said fused portion while respective optical axes thereof are deviated from each other.

29. A dispersion-compensating module according to claim 27, wherein said pair of optical fibers are fusion-spliced at said fused portion while respective core regions thereof are bent.

30. A dispersion-compensating module according to claim 27, wherein said fusion-spliced pair of optical fibers each have a core region whose diameter enhances toward said fused portion.

31. A dispersion-compensating module according to claim 19, wherein, of the light signals outputted from said out end, at least light signals each having a center wavelength thereof in the wavelength range of 1530 nm to 1565 nm have an optical power deviation of 0.5 dB or less therebetween.

32. A dispersion-compensating module according to claim 19, wherein, of the light signals outputted from said output end, at least light signals each having a center wavelength thereof in the wavelength range of 1560 nm to 1600 nm have an optical power deviation of 0.5 dB or less therebetween.

33. A dispersion-compensating module according to claim 19, wherein, of the light signals outputted from said output end, at least light signals each having a center wavelength thereof in the wavelength range of 1535 nm to 1560 nm have an optical power deviation of 0.5 dB or less therebetween.

34. A dispersion-compensating module according to claim 19, wherein, of the light signals outputted from said output end, at least light signals each having a center wavelength thereof in the wavelength range of 1575 nm to 1595 nm have an optical power deviation of 0.5 dB or less therebetween.

35. A dispersion-compensating module according to claim 19, wherein, of the light signals outputted from said output end, at least light signals each having a center wavelength thereof in the wavelength range of 1550 nm to 1560 nm have an optical power deviation of 0.2 dB or less therebetween.

36. A dispersion-compensating module according to claim 19, wherein, of the light signals outputted from said output end, at least light signals each having a center wavelength thereof in the wavelength range of 1575 nm to 1585 nm have an optical power deviation of 0.2 dB or less therebetween.

* * * * *